US009858235B2

(12) United States Patent
Matlock et al.

(10) Patent No.: US 9,858,235 B2
(45) Date of Patent: Jan. 2, 2018

(54) EMULATED LEGACY BUS OPERATION OVER A BIT-SERIAL BUS

(71) Applicants: Scott E. Matlock, Austin, TX (US); Ming L. So, Danville, CA (US)

(72) Inventors: Scott E. Matlock, Austin, TX (US); Ming L. So, Danville, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1402 days.

(21) Appl. No.: 13/678,132

(22) Filed: Nov. 15, 2012

(65) Prior Publication Data

US 2014/0136738 A1    May 15, 2014

(51) Int. Cl.
| | |
|---|---|
| *G06F 13/36* | (2006.01) |
| *G06F 13/42* | (2006.01) |
| *G06F 13/38* | (2006.01) |
| *G06F 13/40* | (2006.01) |
| *G06F 11/26* | (2006.01) |

(52) U.S. Cl.
CPC ........ *G06F 13/4282* (2013.01); *G06F 13/387* (2013.01); *G06F 13/4027* (2013.01)

(58) Field of Classification Search
CPC ...... G06F 11/261; G06F 13/385; G06F 9/441; G06F 13/24
See application file for complete search history.

(56) References Cited

U.S. PATENT DOCUMENTS

| | | | | |
|---|---|---|---|---|
| 5,237,676 | A * | 8/1993 | Arimilli et al. | 710/110 |
| 5,857,090 | A * | 1/1999 | Davis et al. | 703/25 |
| 6,549,966 | B1 * | 4/2003 | Dickens et al. | 710/300 |
| 6,658,517 | B1 * | 12/2003 | Niimi et al. | 710/305 |
| 6,950,440 | B1 * | 9/2005 | Conway | H04L 12/4625 370/458 |
| 7,634,611 | B2 * | 12/2009 | Hidai et al. | 710/314 |
| 8,380,908 | B2 * | 2/2013 | Fleming et al. | 710/262 |
| 2005/0283565 | A1 * | 12/2005 | Chiu | G06F 13/4027 711/103 |
| 2011/0238866 | A1 * | 9/2011 | Zitlaw | 710/5 |
| 2013/0185451 | A1 * | 7/2013 | Gelter | 709/231 |
| 2014/0006645 | A1 * | 1/2014 | Matlock | 710/5 |
| 2014/0115209 | A1 * | 4/2014 | Heinrich et al. | 710/110 |

OTHER PUBLICATIONS

ST SPI Protocol TN0897, Oct. 31, 2012, STMicroelectronics.*

(Continued)

*Primary Examiner* — Henry Tsai
*Assistant Examiner* — Christopher a Daley
(74) *Attorney, Agent, or Firm* — Zagorin Cave LLP

(57) ABSTRACT

Legacy bus operations, such as x86 I/O instructions having an address space separate from memory address space, are supported in a system in which I/O devices are coupled to a microcontroller connected via an SPI bus or other bit-serial bus. Each legacy bus operation is recognized and trapped by an interface controller, such as a south-bridge controller, which maps the trapped legacy bus operation into a corresponding bit-serial bus transaction, and transacts this corresponding bit-serial bus transaction on the bit-serial bus. Existing software infrastructure using x86 I/O instructions can remain intact, with I/O transactions bound for the SPI bus.

21 Claims, 11 Drawing Sheets

(56) References Cited

OTHER PUBLICATIONS

"Intel Low Pin Count (LPC) Interface Specification," Intel Corporation, Aug. 2002, Revision 1.1, Document No. 251289-001, pp. 1-54.

"Serial Peripheral Interface Bus," Wikipedia, downloaded May 28, 2012 from http://en.wikipedia.org/wiki/Serial_Peripheral_Interface_Bus, 11 pages.

* cited by examiner

EMULATED LEGACY BUS OPERATION OVER A BIT-SERIAL BUS

BACKGROUND

Field of the Invention

The present invention relates to emulating a legacy bus operation over a bit-serial bus, and more particularly relates to emulating an x86 legacy bus I/O space over a Serial Peripheral Interface (SPI) bus.

Description of the Related Art

The instruction set of some processors includes separate I/O instructions that reference a separate I/O address space different from memory address space. Such instructions, such as the x86 'IN' and 'OUT' instructions, were originally conveyed over system busses that provided for such a separate I/O address space, such as the ISA bus. On more recent systems, such legacy busses have been supplanted by newer, faster, and more efficient busses, such as the Low Pin-Count (LPC) bus, which also includes a separate I/O address space.

Traditionally, I/O transactions using the 'IN' and 'OUT' instructions can only exist on busses that support an I/O address space. For legacy PC devices, those transactions must go over the LPC bus. However, the LPC interface is antiquated and not always appropriate for today's low power platforms.

Currently in the PC industry, the LPC bus is used to connect to specific microcontrollers, for example an ACPI-defined Embedded Controller (EC) or Super I/O (SIO) device. Today, ECs and SIOs implement many of the legacy I/O devices such as a Keyboard Controller, or a Floppy Disk Controller. The LPC bus, however, is specific to the legacy device space and so requires microcontrollers that are designed for that specific task. These microcontrollers tend to have very specific I/O devices and there is not much differentiation among EC or SIO vendor offerings.

For mobile, tablet, and other low-power or space-constrained devices, it is attractive to connect a generic microcontroller with the desired I/O devices to the Host Processor (such as a CPU and/or accelerated processing unit (APU)) via an SPI bus rather than an LPC bus. In addition to the legacy I/O functions required by an EC or SIO, modern systems frequently need co-processing on items such as position sensors (GPS, accelerometers, etc). However, a problem arises because the SPI bus specification has no method to distinguish an I/O access from a memory access. This makes replacing a traditional EC or SIO with a generic microcontroller difficult if the platform designer wants to keep the existing ACPI-defined software interface valid. From a Basic Input/Output System (BIOS) and Operating System (OS) perspective, it is quite valuable to maintain the same software interface across multiple products.

SUMMARY OF EMBODIMENTS

Accordingly, it would be desirable to support legacy I/O instructions in a system that does not include such a legacy bus, in order to preserve the existing base of software for BIOS and OS that uses x86 I/O instructions. For example, in a system in which a microcontroller connected via an SPI bus replaces a traditional specialized microcontroller connected via an LPC bus (or other legacy bus), such software could be used without any changes, and without having to define a totally proprietary software interface. Commands and protocols are defined to map such legacy I/O instructions into specific SPI-bus transactions that would allow the microcontroller with an SPI bus interface to process x86 I/O transactions. Consequently, the existing software (BIOS and OS) infrastructure using x86 I/O instructions can remain intact, with I/O transactions bound for the SPI bus.

More generally, an example embodiment provides a method for use in emulating host processor legacy bus operation over a bit-serial bus. In an embodiment, the method includes trapping, in an interface controller, a legacy bus operation for a host processor, and mapping the trapped legacy bus operation into a bit-serial bus transaction having at least a command phase, an address phase, and a data phase. The method also includes transacting the command phase and address phase of the bit-serial bus transaction with an external controller on a bit-serial bus, and then, after receiving or transmitting a ready indication, transacting the data phase of the bit-serial bus transaction with the external controller.

In some embodiments, the command phase conveys a command identifier for the bit-serial bus transaction, and the command identifier encodes a size for at least one of the corresponding address phase and the corresponding data phase of the bit-serial bus transaction. In some embodiments, the ready indication includes a first data state presented on a first data line of the bit-serial bus before completion of the address phase if not yet ready to transact the data phase of the bit-serial bus transaction, and a second data state presented on the first data line of the bit-serial bus to indicate readiness to transact the data phase of the bit-serial bus transaction during subsequent clock cycles of the bit-serial bus.

In some embodiments, the trapped legacy bus operation is a host processor legacy I/O operation having a separate I/O address space different than memory address space. The command phase conveys a command identifier which specifies the host processor legacy I/O operation as an I/O read operation or an I/O write operation. The address phase conveys an I/O port number associated with the host processor legacy I/O operation. The data phase conveys a data group associated with the host processor legacy I/O operation, and the ready indication is received by the interface controller to indicate the external controller on the bit-serial bus is ready to transact the data phase of the bit-serial bus transaction.

In some embodiments, the command identifier encodes a size for the corresponding data group associated with the host processor legacy I/O operation.

In some embodiments, a first sub-field of the command identifier encodes the host processor legacy I/O operation as a read I/O operation or a write I/O operation, a second sub-field of the command identifier encodes a number which indicates the size for the corresponding address phase which conveys the I/O port number for the host processor legacy I/O operation, and a third sub-field of the command identifier encodes a number which indicates the size for the corresponding data group associated with the host processor legacy I/O operation.

In some embodiments, the bit-serial bus is an SPI bus, the command identifier is an 8-bit entity, the I/O port number is a 16-bit entity, and the data group for a given operation is an 8-bit, 16-bit, or 32-bit entity.

In some embodiments, the trapped legacy bus operation is a bus operation requested by the external controller on the bit-serial bus, and the command phase and the address phase together communicate the requested bus operation and a channel number associated with the requested bus operation. In certain of these embodiments, the host processor legacy bus operation is a legacy direct memory access (DMA)

operation having a separate channel address space different than memory address space. In certain of these embodiments, the host processor legacy bus operation is a legacy bus master (BM) operation. In some of such embodiments, the method also includes, after transacting the address phase, receiving a bus master command phase and bus master address phase from the external controller, and then asserting the ready indication to the external controller when ready to transact the data phase of the bit-serial transaction.

In certain of these embodiments, the method also includes conveying a bus operation request to the interface controller by way of a bit-serial command to indicate a type of bus operation, whether read or write, and a channel number associated with the requested bus operation.

In some embodiments, an apparatus includes an interface controller operable to trap a legacy bus operation for a host processor, and map the trapped legacy bus operation into a bit-serial bus transaction having at least a command phase, an address phase, and a data phase. The interface controller is further operable to transact the command phase and address phase of the bit-serial bus transaction with an external controller on the bit-serial bus, and then, after receiving or transmitting a ready indication, transact the data phase of the bit-serial bus transaction with the external controller.

In some embodiments, the apparatus includes the external controller on the bit-serial bus, and this external controller is operable to provide the ready indication to indicate the external controller is ready to transact the data phase of the bit-serial bus transaction. The external controller includes a second interface coupled to a target device for the legacy bus operation. In some embodiments, the bit-serial bus is an SPI bus.

In some embodiments, the trapped legacy bus operation is a host processor legacy I/O operation having a separate I/O address space different than memory address space. The command phase conveys a command identifier which specifies the host processor legacy I/O operation as an I/O read operation or an I/O write operation. The address phase conveys an I/O port number associated with the host processor legacy I/O operation. The data phase conveys a data group associated with the host processor legacy I/O operation, and the ready indication is received by the interface controller to indicate the external controller is ready to transact the data phase of the bit-serial bus transaction.

In some embodiments, the apparatus also includes the host processor, which is coupled to the interface controller by way of at least one intervening bus therebetween.

In some embodiments, an apparatus includes a first controller that includes a bit-serial bus interface operable to transact a bit-serial bus transaction with a second controller coupled thereto by way of a bit-serial bus. The bit-serial bus transaction is mapped from a legacy bus operation for a host processor and trapped by the second controller. The bit-serial bus transaction includes at least a command phase, an address phase, and a data phase. The first controller also includes a second interface operable to communicate with a target device for the legacy bus operation.

In some embodiments, the bit-serial interface operable to transact the bit serial transaction is operable to transact the command phase and address phase of the bit-serial bus transaction, then, after receiving or transmitting a ready indication, transact the data phase of the bit-serial bus transaction.

In some embodiments, the trapped legacy bus operation is a host processor legacy I/O operation having a separate I/O address space different than memory address space. The command phase conveys a command identifier which specifies the host processor legacy I/O operation as an I/O read operation or an I/O write operation. The address phase conveys an I/O port number associated with the host processor legacy I/O operation. The data phase conveys a data group associated with the host processor legacy I/O operation, and the ready indication is transmitted by the first controller to indicate the first controller is ready to transact the data phase of the bit-serial bus transaction.

In some embodiments, the second apparatus also includes the target device coupled to the first controller by way of the second interface.

A computer readable storage medium including data structures encoding an aspect of an interface controller is provided in some embodiments. Such an interface controller is operable to trap a legacy bus operation for a host processor, and map the trapped legacy bus operation into a bit-serial bus transaction having at least a command phase, an address phase, and a data phase. The interface controller is further operable to transact the command phase and address phase of the bit-serial bus transaction with an external controller on the bit-serial bus, and then, after receiving or transmitting a ready indication, transact the data phase of the bit-serial bus transaction with the external controller.

Another example embodiment provides a computer readable storage medium including data structures encoding an aspect of a controller. Such a controller includes a bit-serial bus interface operable to transact a bit-serial bus transaction with a second controller coupled thereto by way of a bit-serial bus. The bit-serial bus transaction is mapped from a legacy bus operation for a host processor and trapped by the second controller. The bit-serial bus transaction includes at least a command phase, an address phase, and a data phase. The controller also includes a second interface operable to communicate with a target device for the legacy bus operation.

The inventive aspects described herein are specifically contemplated to be used alone as well as in various combinations. The invention in several aspects is contemplated to include circuits (including integrated circuits), related methods of operation, systems incorporating same, and computer-readable storage media encodings of such circuits and methods and systems, all as described herein in greater detail and as set forth in the appended claims.

The foregoing is a summary and thus contains, by necessity, simplifications, generalizations and omissions of detail. Consequently, those skilled in the art will appreciate that the foregoing summary of embodiments is illustrative only and is not intended to be in any way limiting of the invention. It is only the claims, including all equivalents, in this or any application claiming priority to this application, that are intended to define the invention.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
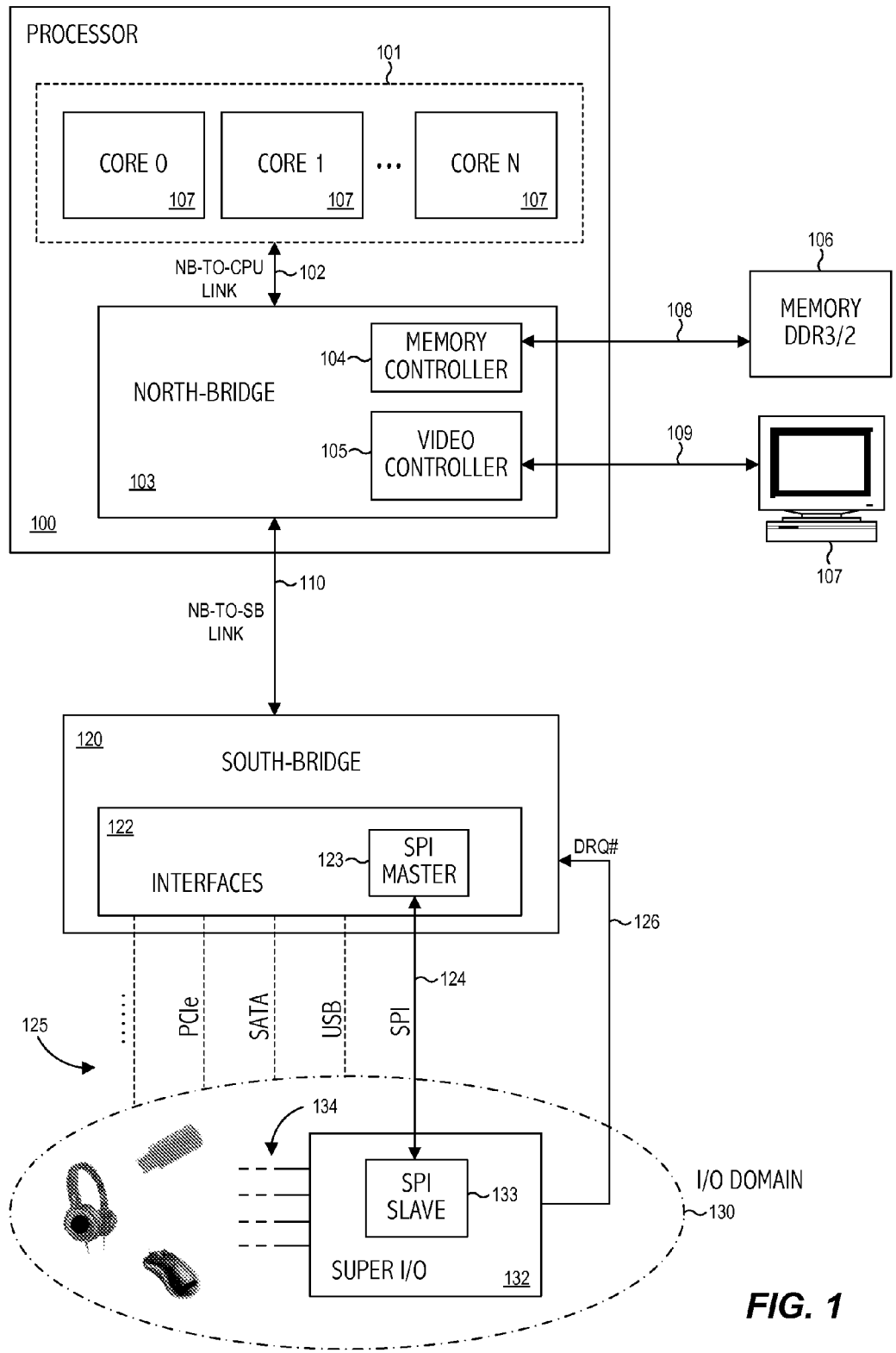
FIG. 1 depicts a high-level block diagram of a computer system according to an embodiment.

Referring to FIG. 1, a high-level conceptual block diagram of a computer system according to an embodiment is illustrated. This system includes a processor 100 which, in this example, includes one or more CPU cores 107 coupled to a north-bridge 103 via a NB-to-CPU bus 102. A memory 106 is coupled via bus 108 to a memory controller 104 within the north-bridge 103, and a video display 107 is coupled via bus 109 to a video controller 105 within the north-bridge 103.

A south-bridge 120 is coupled via a NB-to-SB bus 110 to the north-bridge 103. The south-bridge 120 (also referred to as an I/O Controller Hub) represents the input/output (I/O) domain 130, "presiding" over I/O devices and main I/O controllers. The NB-to-SB bus 110 may utilize, e.g., a Hypertransport™ (HT) link or PCIe™ link. The south-bridge 120 includes one or more interfaces 122 to a variety of corresponding busses 125, including, for example, a PCIe bus, a SATA bus, a USB bus, as well as an SPI bus 124. Such busses 125 couple the south-bridge 120 to the I/O domain 130 that includes many of the I/O devices, and particularly includes legacy devices such as USB drives, a mouse and/or similar pointing devices, audio controllers, etc. In this exemplary system the I/O domain 130 also includes a "super I/O" controller 132 (i.e., an SIO 132) which is coupled to the south-bridge 120 by way of the SPI bus 124, and which SIO 132 may be coupled to other I/O devices by way of busses 134. In such a system, the SPI bus 124 may be the only implemented one of the busses 125, and one or more of such SIO devices 132 may be implemented. An optional DRQ# request line 126 is provided on the south-bridge 120, which may be driven by the one or more SIO devices 132 to request an interrupt or other operation, as further described below.

In an exemplary operation, host software running on one of the x86 cores 107 would issue a legacy bus operation (e.g., an OUT instruction that specifies the I/O port to be written and the data to be written to that I/O port). This legacy bus operation is recognized and trapped (or "captured" or "claimed") by an interface controller, such as the south-bridge 120, which maps the trapped legacy bus operation into a corresponding bit-serial bus transaction, and executes this corresponding bit-serial bus transaction on the SPI bus 124 using an SPI Master controller 123 coupled to a SPI Slave controller 133 within the SIO 132. The SPI Master controller 123 may be implemented as an integral part of the south-bridge 120, or as an identifiable sub-set of the interface controller (such as the interfaces block 122), or as a stand-alone device coupled to the south-bridge 120 (or other interface controller). The I/O operations themselves are carried out by the SIO 132.

The interface controller that "claims" the I/O accesses to any generic I/O address, or groups of I/O addresses, may be implemented in dedicated hardware in the south-bridge 120 as described above (or other external entity), or may be implemented as dedicated hardware in the north-bridge 103, or in another Accelerated Processing Unit (APU) such as a graphics processor. Such dedicated hardware would then convert those I/O accesses to a pre-defined set of one or more SPI-bus transactions which are then directed to a SPI Master controller (such as the SPI Master controller 123) and executed over the SPI bus to one or more SPI Slave controllers (such as the SPI Slave controller 133 within SIO 132).

Figure 2:
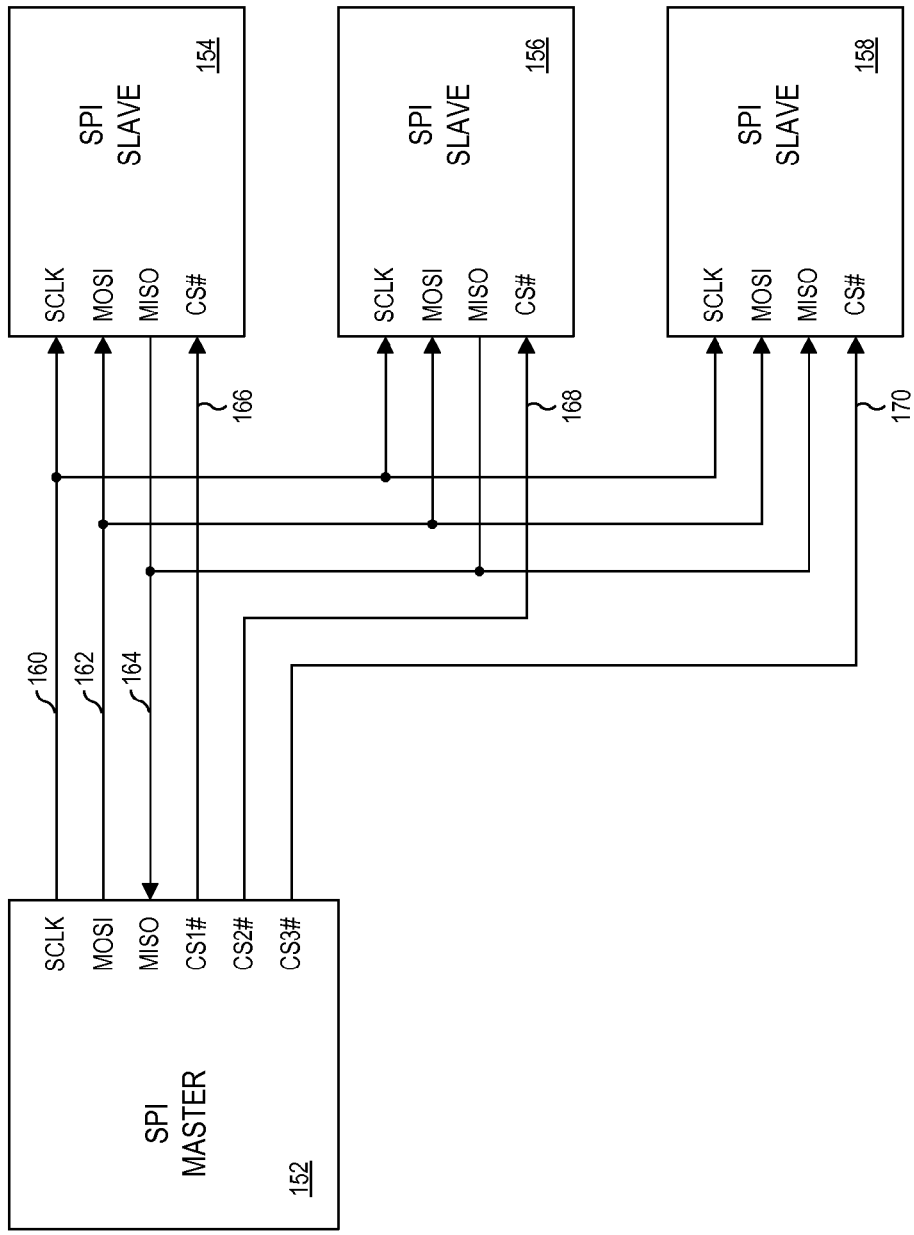
FIG. 2, labeled prior art, depicts a block diagram of several devices connected by way of an SPI bus.

Referring now to FIG. 2, an exemplary SPI bus arrangement is depicted in which an SPI Master controller 152 (also referred to herein as an SPI Host controller) is coupled to each of three different SPI Slave controllers 154, 156, 158. These controllers operate in a master/slave mode where the SPI Master controller initiates the bus operation. The SPI Master controller 152 generates a SCLK serial clock signal 160 which is coupled to all three SPI Slave controllers 154, 156, 158. The SPI bus includes a bit-serial data signal 162 that is driven by the SPI Master 152 and is coupled to a corresponding input on each of the SPI Slave controllers 154, 156, 158, and which signal is also known as the "Master Out, Slave In" signal MOSI. In addition, the SPI bus includes a bit-serial data signal 164 that is coupled to a corresponding output on each of the SPI Slave controllers 154, 156, 158, but driven only by a selected SPI Slave controller, which signal is coupled to an input of the SPI Master controller 152, and which signal is also known as the "Master In, Slave Out" signal MISO. The SCLK signal generated by the SPI Master clocks all data transfers from the SPI Master to an SPI Slave conveyed on the MOSI pin, and all data transfers from an SPI Slave to the SPI Master on the MISO pin. A separate corresponding chip select signal is generated by the SPI Master 152 to select a corresponding one of the SPI Slave controllers 154, 156, 158. For example, the CS1# signal conveyed on node 166 is coupled to SPI Slave controller 154, the CS2# signal conveyed on node 168 is coupled to SPI Slave controller 156, and the CS3# signal conveyed on node 170 is coupled to SPI Slave controller 158. Such SPI Slave controller selection and data clocking of an SPI bus are well known, as are other variations in such SPI-bus connected systems. For example, a number of SPI Slave controllers may be daisy-chain connected, with the serial output (MISO) pin of one SPI Slave controller connected to the serial input (MOSI) pin of the following SPI Slave controller, as is known in the art. In addition, a single SPI Slave controller may be connected to an SPI Master controller.

Write to x86 I/O Port

Figure 3:
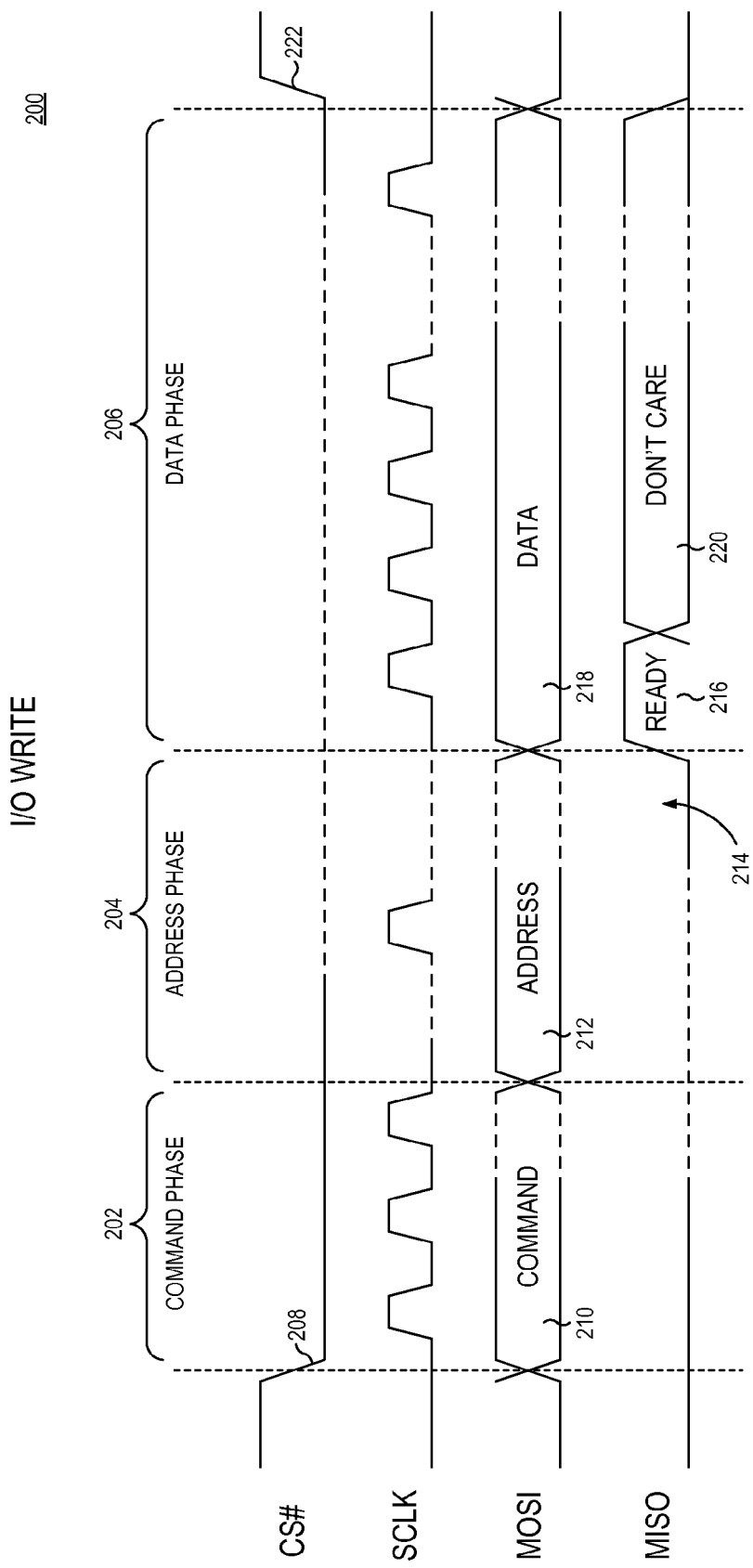
FIG. 3 depicts a timing diagram for an SPI bus transaction corresponding to a legacy I/O WRITE operation according to an embodiment.

Referring now to FIG. 3, an exemplary SPI bus operation is depicted that corresponds to an I/O WRITE operation to an x86 I/O port. As described above, host software running on an x86 core would issue an OUT instruction that specifies the I/O port to be written and the data to be written to that I/O port. This I/O WRITE operation (i.e., "legacy bus operation") is recognized and trapped (or "captured" or "claimed") by an interface controller, such as the southbridge 120 described above. The interface controller maps the trapped I/O operation into a corresponding bit-serial bus transaction, and executes this corresponding bit-serial bus transaction on the SPI bus using an SPI Master controller (i.e., SPI Host controller) that may be implemented within the interface controller.

For the exemplary I/O WRITE operation depicted here, the corresponding SPI bus transaction includes a command phase 202, an address phase 204, and a data phase 206. During each respective phase, a corresponding command identifier 210, address identifier 212, and data group 218 is conveyed in a bit-serial manner on the SPI bus. The SPI bus transaction is initiated by the SPI Master controller by driving the CS# signal to an active state (shown at falling edge 208). The CS# signal is held low for the duration of the SPI transaction. While the CS# signal is shown here as an active-low signal, in some SPI bus embodiments, the polarity of the select signal may be active high.

The SPI Host also generates the clock signal SCLK. The SPI Host then bit-serially drives the command identifier 210 on the MOSI pin, and toggles the SCLK signal accordingly during each bit interval. Each bit of the command identifier 210 is sequentially driven onto the MOSI pin and strobed (i.e., sampled) by the SPI Slave device on a rising (or alternatively, falling) edge of the SCLK signal, as is well known for an SPI bus. The command identifier 210 indicates to the SPI slave device (i.e., an external device on the bit-serial bus) that the transaction is an I/O WRITE operation. In certain embodiments, the size of the command identifier 210 may be an 8-bit command field, although other command field sizes are also easily accommodated since the SPI bus is a bit-serial bus. Exemplary command identifier formats are described below.

After the entire command identifier 210 has been transmitted on the MOSI pin (and thus the command phase 202 is complete), the SPI Host controller proceeds to the address phase 204 by bit-serially transmitting the address identifier 212 on the MOSI pin. This address identifier 212 corresponds to the port number in the x86 OUT instruction. In certain embodiments, the size of the address identifier 212 may be a 16-bit address field, although other address field sizes are also easily accommodated. The address field may be fixed in size, or may be variable and its size indicated by a sub-field (or other encoding) of the command identifier 210.

At this point in the bit-serial bus transaction, the SPI Host controller has selected a particular SPI slave device (by asserting CS#), transmitted a command identifier 210 to indicate an I/O WRITE operation, and transmitted an address identifier 212 corresponding to the I/O port number for the OUT instruction. However, the selected SPI slave device (or the microcontroller which it serves, etc.) may not be immediately ready to receive the data to be written. If a WAIT state is desired, the SPI slave controller drives the MISO pin low at time 214 prior to the last address bit of the address phase 204 (i.e., the last bit of the address identifier 212), and holds the MISO pin low for as long as the WAIT state is necessary. When the selected SPI slave controller is ready for data, it drives the MISO pin high for a clock cycle 216 to indicate READY, and the SPI Host controller then bit-serially transmits data group 218. Thus, the selected SPI slave device can delay execution of the data phase 206 of the bit-serial transaction until the SPI slave device is ready to receive the data group 218 from the SPI Host controller. During the remaining portion of the data phase 206, the state of the MISO pin is a "don't care" (labeled 220) and the MISO pin need not be sampled by the SPI Host after the READY signal is presented for a clock cycle.

In some embodiments, the SPI Host controller waits until the READY indication is transmitted, then bit-serially transmits the data group 218 beginning on the next clock. Alternatively, the SPI Host controller may present and hold the first bit of the data group 218 on the MOSI pin during the WAIT state. The SPI Slave controller can sample the MOSI pin during the same clock cycle that it drives the READY indication on the MISO pin, and the SPI Host controller can then bit-serially transmit remaining bits of the data group 218 on subsequent clock cycles.

In certain embodiments, the data group 218 may be fixed in size, or may be variable and its size indicated by a sub-field of the command identifier 210. For example, the data group 218 may be an 8-bit data group (i.e., a "byte"), a 16-bit data group (i.e., a "word"), or a 32-bit data group (i.e., a "double word"), as encoded by a sub-field of the command identifier 210, and which size corresponds to the data size of the particular x86 OUT instruction. Several exemplary command formats are described below. At the conclusion of the data phase 206, the bit-serial transaction is complete, and the SPI Host controller de-asserts the CS# pin (at rising edge 222) to de-select the particular SPI slave controller. In some embodiments utilizing non-posted write cycles, the SPI Host controller can then send an acknowledgement (e.g., "Target Done") back to the x86 core that issued the I/O WRITE operation.

Read from x86 I/O Port

Figure 4:
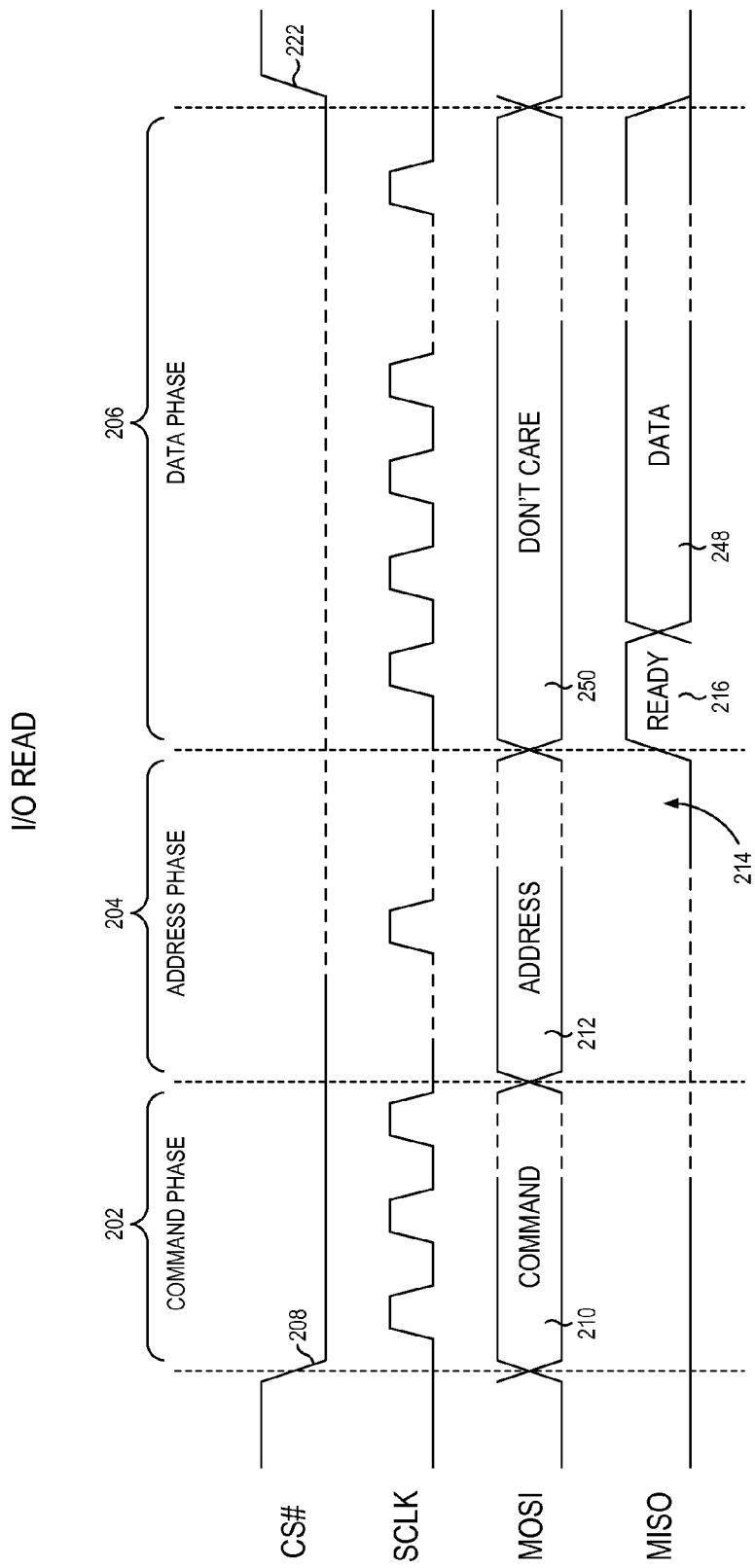
FIG. 4 depicts a timing diagram for an SPI bus transaction corresponding to a legacy I/O READ operation according to an embodiment.

Referring now to FIG. 4, an exemplary SPI bus operation is depicted that corresponds to an I/O READ operation from an x86 port. As described above, host software running on an x86 core would issue an IN instruction that specifies the I/O port to be read. This I/O READ operation is recognized and trapped by the interface controller, which maps the trapped I/O READ operation into a corresponding bit-serial bus transaction, and executes this corresponding bit-serial bus transaction on the SPI bus.

For the exemplary I/O READ operation depicted here, the corresponding SPI bus transaction includes a command phase 202, an address phase 204, and a data phase 206, as before. In this case, the command identifier 210 indicates to the SPI slave device that the transaction is an I/O READ operation, and the address identifier 212 corresponds to the port number of the x86 IN instruction.

If a WAIT state is desired (e.g., if the selected SPI slave controller is not ready to provide the read data back to the SPI Host controller), the SPI slave controller can insert a WAIT state by driving the MISO pin low at time 214 prior to the last address bit of the address phase 204, and holding the MISO pin low for as long as the WAIT state is necessary. When the selected SPI slave device is ready to transmit the read data, it drives the MISO pin high for a clock cycle 216 to indicate READY, and then bit-serially transmits the data group 248 on the MISO pin beginning on the next clock. This data group 248 is bit-serially strobed by the SPI Host on each clock. During the data phase 206, the state of the MOSI pin is a "don't care" (labeled 250) as the MISO pin need not be sampled by the SPI Slave. At the conclusion of the data phase 206, the SPI bus read transaction is complete, and the SPI Host controller de-asserts the CS# pin (at rising edge 222) to de-select the particular SPI slave controller.

The SPI Host controller can then forward the read data back to the x86 core that issued the IN instruction.

As with the I/O write operation above, the data group 248 may be fixed in size, or may be variable and its size indicated by a sub-field (or other encoding) of the command identifier 210. For example, the data group 248 may be an 8-bit data group (i.e., a "byte"), a 16-bit data group (i.e., a "word"), or a 32-bit data group (i.e., a "double word"), as encoded by a sub-field of the command identifier 210, and which corresponds to the data size of the particular x86 IN instruction. Several exemplary command formats are described below.

In certain embodiments, the size of the command identifier 210 may be an 8-bit command field, although other command field sizes are also easily accommodated. In certain embodiments, the size of the address identifier 212 may be a 16-bit address field, although other address field sizes are also easily accommodated. The address field may be fixed in size, or may be variable and its size indicated by a sub-field (or other encoding) of the command identifier 210.

In some embodiments, the address identifier 212 is a 16-bit I/O address, and the command identifier 210 is an 8-bit command field that specifies the following SPI bus commands:

| Operation | Data Size | SPI Command |
| --- | --- | --- |
| I/O Write | 8-bit | 0xA5 |
| I/O Write | 16-bit | 0xA6 |
| I/O Write | 32-bit | 0xA7 |
| I/O Read | 8-bit | 0xB5 |
| I/O Read | 16-bit | 0xB6 |
| I/O Read | 32-bit | 0xB7 |

Firmware running on the external microcontroller (e.g., corresponding to SIO 132) would recognize the commands as I/O reads or writes and could respond accordingly. For example, the ACPI specification defines I/O ports 62 and 66 as the software interface to an embedded controller (EC). By using this method with an interface controller connected by way of the SPI bus to a generic microcontroller, the microcontroller firmware could process the ACPI commands from the BIOS or OS. Advantageously, from a software standpoint, no changes in BIOS or OS code would be necessary. This would increase the usable microcontrollers for EC or SIO functions from dozens to hundreds. Plus, the generic microcontroller could provide alternative or additional functions such as position sensor control, thus reducing overall system cost.

As described above, the existing base of BIOS and OS software that uses x86 I/O instructions could be used without any changes, when a microcontroller connected via an SPI bus replaces a traditional specialized LPC-based microcontroller (or other legacy bus-connected controller).

Write to SIO Memory

Figure 5:
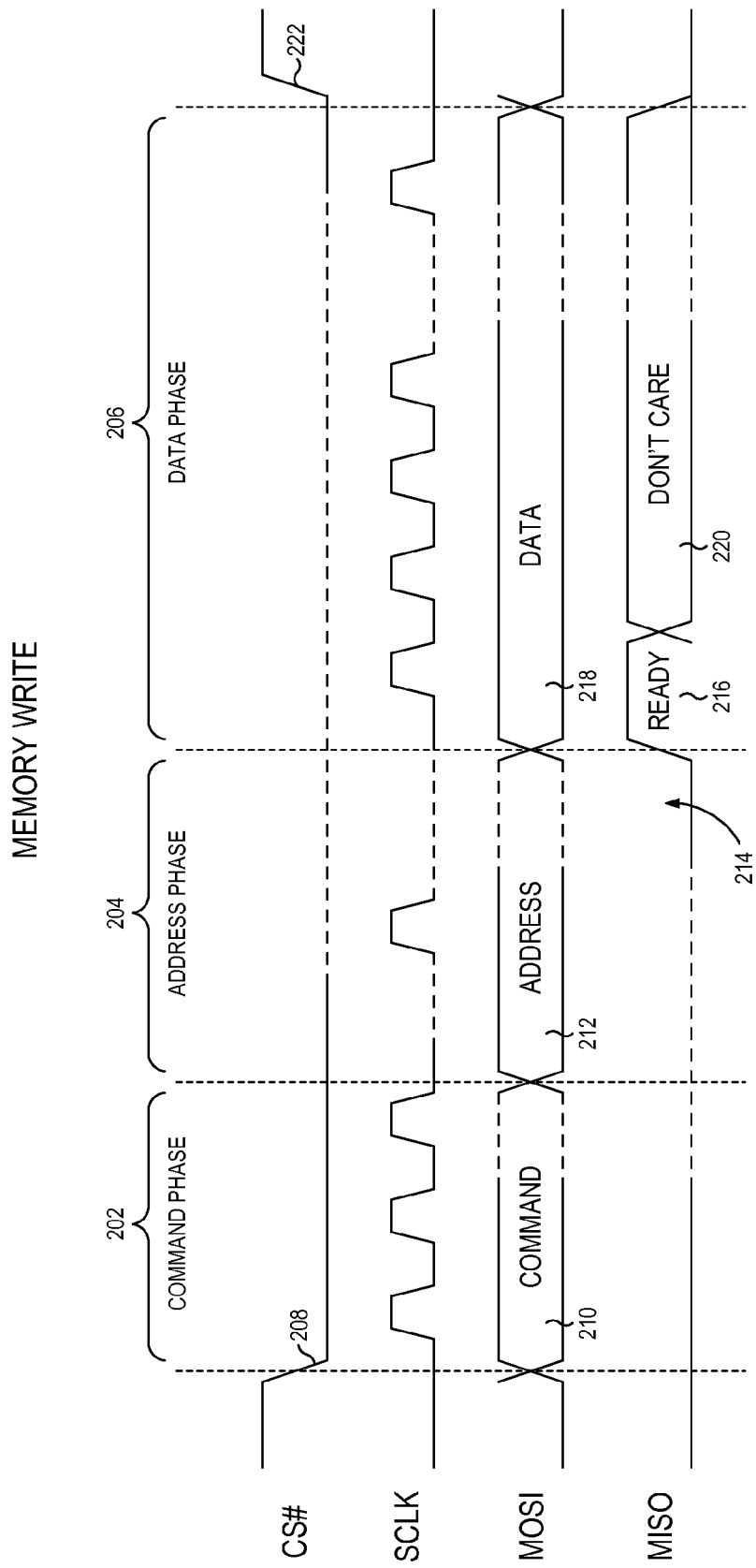
FIG. 5 depicts a timing diagram for an SPI bus transaction corresponding to a legacy MEMORY WRITE operation according to an embodiment.

Referring now to FIG. 5, an exemplary SPI bus operation is depicted that corresponds to a WRITE operation to a memory location reachable via (or within) the SIO 132 device. Many of the details are identical or similar to the I/O WRITE operation described above in regards to FIG. 3, and will not be repeated here. This SIO memory WRITE operation is recognized and trapped by the interface controller (e.g., south-bridge 120), which maps the trapped operation into a corresponding bit-serial bus transaction, and executes this corresponding bit-serial bus transaction on the SPI bus 124.

In this case, the command identifier 210 encodes the transaction as an SIO memory WRITE operation, and encodes the size of the address identifier 212 (e.g., a 32-bit address field) which corresponds to the memory address of the x86 write instruction, and also encodes the data group 218 size (e.g., an 8-bit, 16-bit, or 32-bit data group), although other field and data group sizes are also easily accommodated.

Insertion of a WAIT state may be achieved, as before, by driving the MISO pin low at time 214 before the last bit of the address identifier 212 is strobed by the SPI Slave controller (e.g., on the SCLK rising edge), and then, when ready, driving the MISO pin high for a clock cycle 216 to indicate READY and to thus start the data phase 206 of the bus transaction.

Read from SIO Memory

Figure 6:
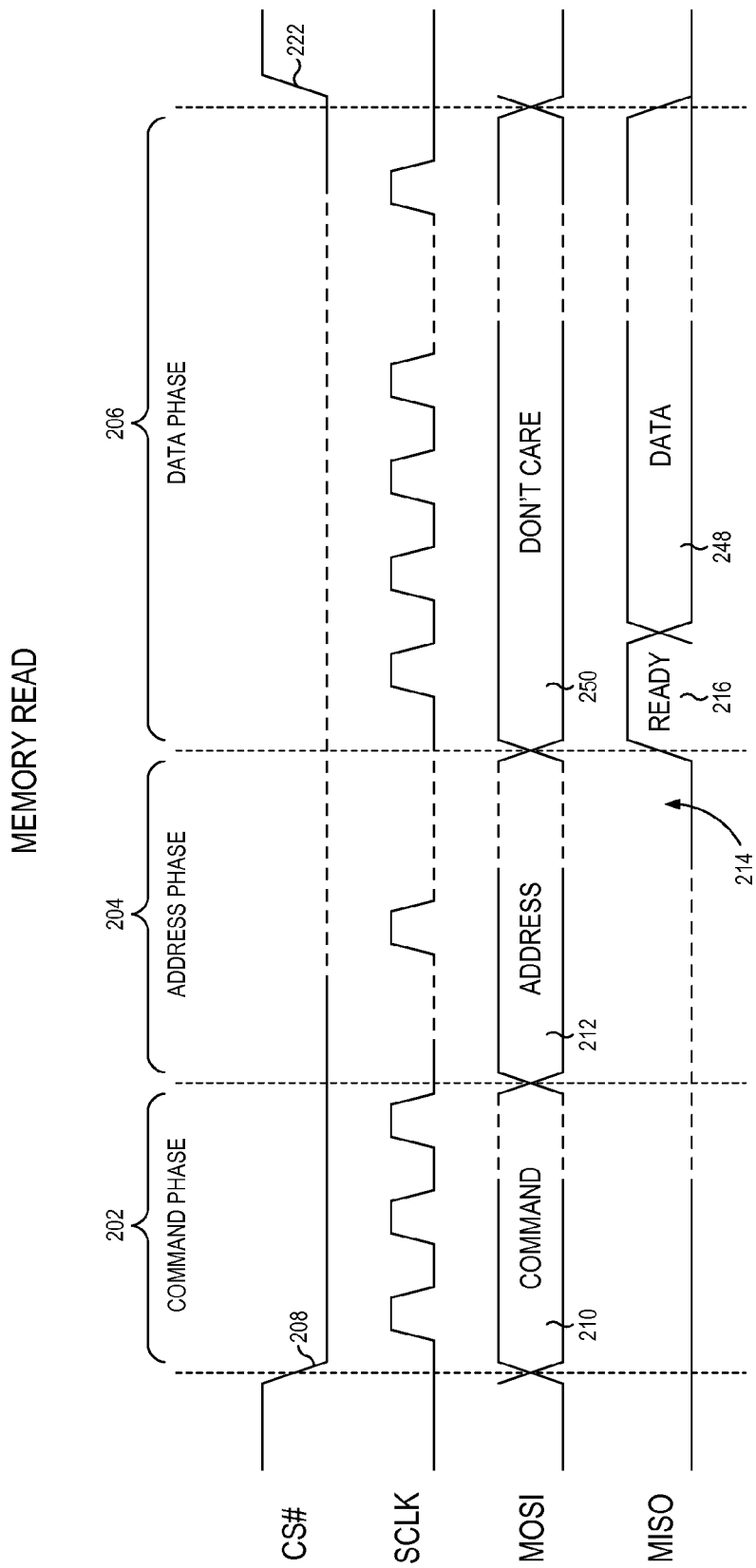
FIG. 6 depicts a timing diagram for an SPI bus transaction corresponding to a legacy MEMORY READ operation according to an embodiment.

Referring now to FIG. 6, an exemplary SPI bus operation is depicted that corresponds to a READ operation from a memory location reachable via (or within) the SIO 132 device. Many of the details are identical or similar to the I/O READ operation described above in regards to FIG. 4, and are not repeated here. This SIO memory READ operation is recognized and trapped by the interface controller (e.g., south-bridge 120), which maps the trapped operation into a corresponding bit-serial bus transaction, and executes this corresponding bit-serial bus transaction on the SPI bus 124.

In this case, the command identifier 210 encodes the transaction as an SIO memory READ operation, and encodes the size of the address identifier 212 (e.g., a 32-bit address field) which corresponds to the memory address of the x86 read instruction, and also encodes the data group 248 size (e.g., an 8-bit, 16-bit, or 32-bit data group), although other field and data group sizes are also easily accommodated.

Insertion of a WAIT state may be achieved, as before, by driving the MISO pin low at time 214 prior to the last address bit of the address phase 204, and then driving the MISO pin high for a clock cycle 216 to indicate READY and to thus start the data phase 206 of the SPI bus transaction.

DMA/Bus Master/Interrupt Request

Other types of legacy bus operations may also be implemented using an SIO controller (or other microcontroller) coupled by way of an SPI bus or other bit-serial bus. In the examples below, an external pin is used to communicate a request to the SPI Host controller to execute one of these kinds of transactions.

Figure 7:
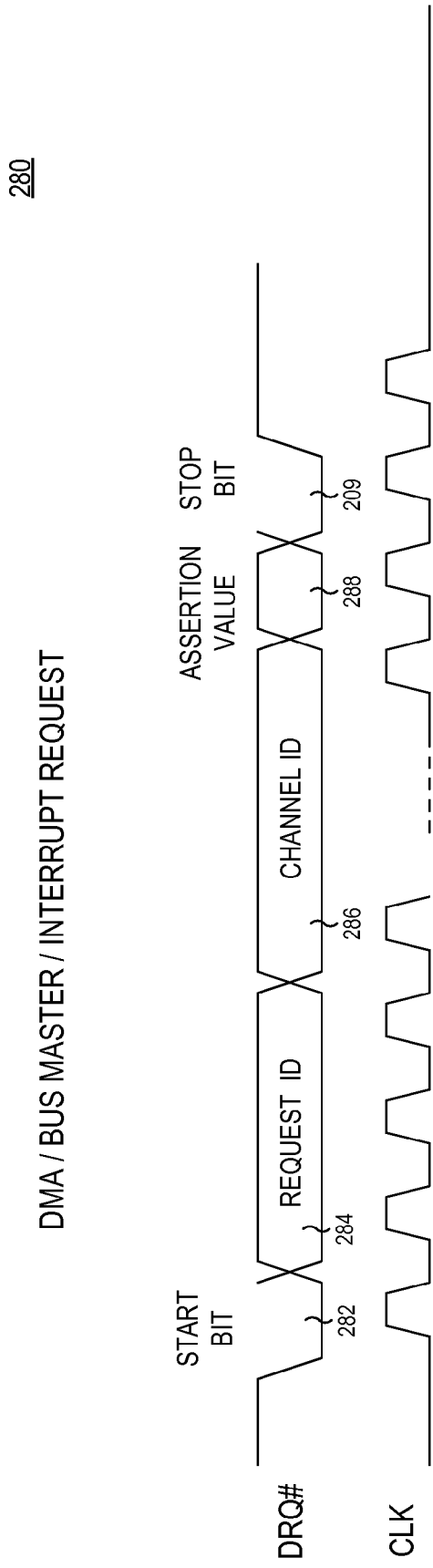
FIG. 7 depicts a timing diagram for a request protocol to request an SPI bus transaction corresponding to a DMA or BUS MASTER or INTERRUPT operation according to an embodiment.

Referring now to FIG. 7, an exemplary request protocol is depicted in which a bit-serial command is conveyed to the SPI Host controller on a DRQ# pin of the SPI Host controller (e.g., DRQ# pin 126 shown in FIG. 1). The command protocol includes a start bit 282, a 3-bit request identifier 284, a 5-bit channel identifier 286, an assertion value 288, and a stop bit 290. By using the start bit 282 and the stop bit 290, such a request may be conveyed asynchronously to the SPI Host controller. Each bit of this request protocol is sampled on a respective edge (rising or falling, as appropriate) of the clock signal SCLK. If the clock signal SCLK is not present, the SPI Host controller will start the SCLK in response to receiving the start bit 282. In addition, an external device may initiate another request immediately after the stop bit 290.

The 3-bit request identifier 284 is used to signal whether the external device is requesting a DMA operation, a Bus Master operation, or an interrupt request. Exemplary assignments of this request identifier field includes the binary value 2'b101 for a DMA operation, the binary value 2'b110 for a bus master operation, and the binary value 2'b111 for an interrupt request, but other assignments are also contemplated. Such a 3-bit request identifier 284 can indicate up to 8 separate operation requests. Shorter or longer request identifier fields are also easily accommodated since this protocol is a bit-serial protocol.

The 5-bit channel identifier 286 is used to indicate which DMA channel, bus master, or interrupt corresponds to the requested operation. Lastly, the 1-bit assertion value 288 provides an input value that may be useful for a given operation request. For a DMA operation, the assertion value 288 may be driven low for assertion, and driven high for de-assertion. For an interrupt request, the assertion value 288 represents the virtual wire state of that interrupt. For a bus master operation, the assertion value 288 is not presently contemplated as being used, and thus is a "don't care" state that has no meaning for a bus master operation request. In response to such an operation request, the SPI Host controller then executes the requested operation over the SPI bus.

DMA Write Operation

Figure 8:
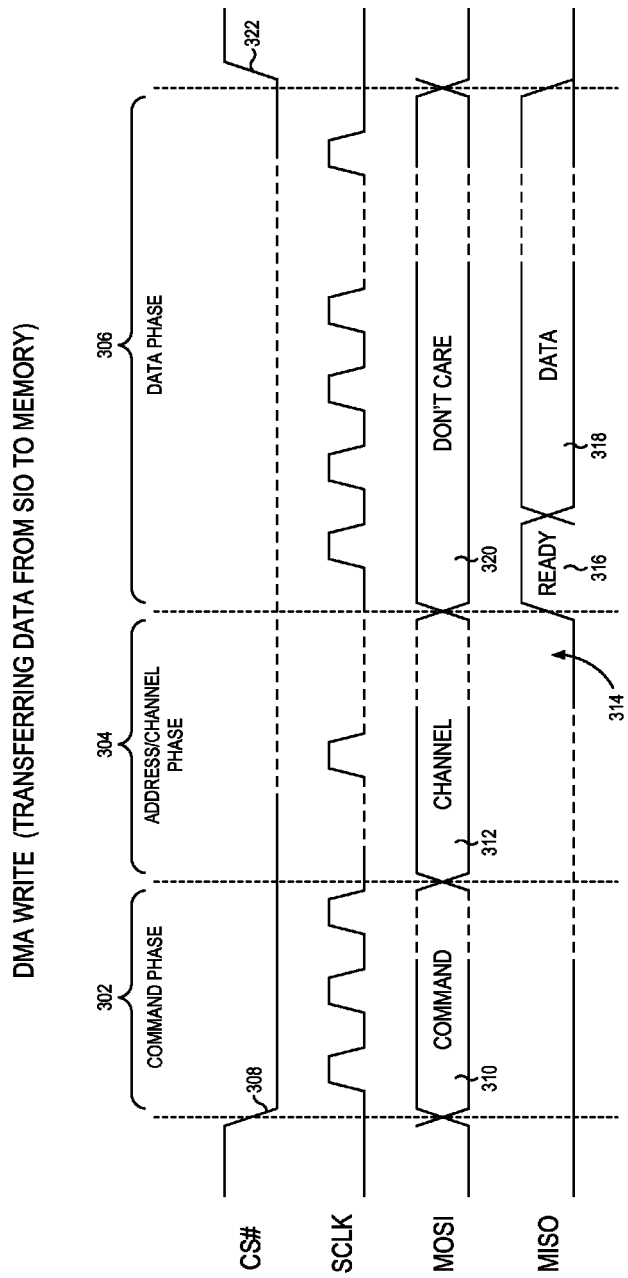
FIG. 8 depicts a timing diagram for an SPI bus transaction corresponding to a DMA WRITE operation according to an embodiment.

Referring now to FIG. 8, an exemplary SPI bus operation is depicted that corresponds to a DMA WRITE operation to transfer data from the SIO device to memory. The request for this DMA WRITE operation, as described above, is recognized and "trapped" by the SPI Host controller, which maps the trapped operation into a corresponding bit-serial bus transaction, and executes this corresponding bit-serial bus transaction on the SPI bus.

For the exemplary DMA WRITE operation depicted here, the corresponding SPI bus transaction includes a command phase 302, an address/channel phase 304, and a data phase 306. During each respective phase, a corresponding command identifier 310, channel (i.e., "address") identifier 312, and data group 318 is conveyed in a bit-serial manner on the SPI bus. The SPI bus transaction is initiated by the SPI Host controller by driving the CS# signal to an active state at falling edge 308, and the CS# signal is held active low for the duration of the SPI bus transaction.

The SPI Host then bit-serially drives the command identifier 310 on the MOSI pin, and toggles the SCLK signal accordingly during each bit interval. The command identifier 310 indicates to the SPI slave device that the transaction is a DMA WRITE operation. In certain embodiments, the size of the command identifier 310 may be a 5-bit command field, of which 4 bits indicate a DMA operation, and 1 bit indicates whether a write or read operation, although other sizes are easily accommodated.

After the entire command identifier 310 has been transmitted on the MOSI pin, the SPI Host controller proceeds to the address/channel phase 304 by bit-serially transmitting the DMA channel identifier 312 on the MOSI pin. This channel identifier 312 corresponds to the requesting channel indicated in the DMA request received by the SPI Host. In certain embodiments, the size of the channel identifier 312 may be a 3-bit channel field, although other channel field sizes are also easily accommodated. The channel field may be fixed in size, or may be variable and its size indicated by a sub-field (or other encoding) of the command identifier 310.

Thus far, the SPI Host controller has selected a particular SPI slave device (by asserting CS#) and transmitted a command identifier 310 to indicate a DMA WRITE operation, and transmitted a channel identifier 312 corresponding to the DMA request. However, the selected SPI slave device may not be immediately ready to transmit the data to be written. Insertion of a WAIT state may be achieved, as before, by the SPI slave controller driving the MISO pin low at time 314 prior to the last bit of the channel phase 304, and then, when ready, driving the MISO pin high for a clock cycle 316 to indicate READY and to thus start the data phase 306 of the SPI bus transaction. The SPI Slave controller then bit-serially transmits data group 318 beginning on the next clock. On the last transfer, a transfer complete (TC) may be indicated in a special DMA command.

At the conclusion of the data phase 306, the bit-serial transaction is complete, and the SPI Host controller de-asserts the CS# pin at rising edge 322 to de-select the particular SPI slave device.

If desired, a DMA VERIFY operation may also be provided, which may be similar to a DMA WRITE operation, except the host will not transfer data to memory. Instead, the SPI Host controller compares the data received during the DMA operation against the existing data in the corresponding memory location(s).

DMA Read Operation

Figure 9:
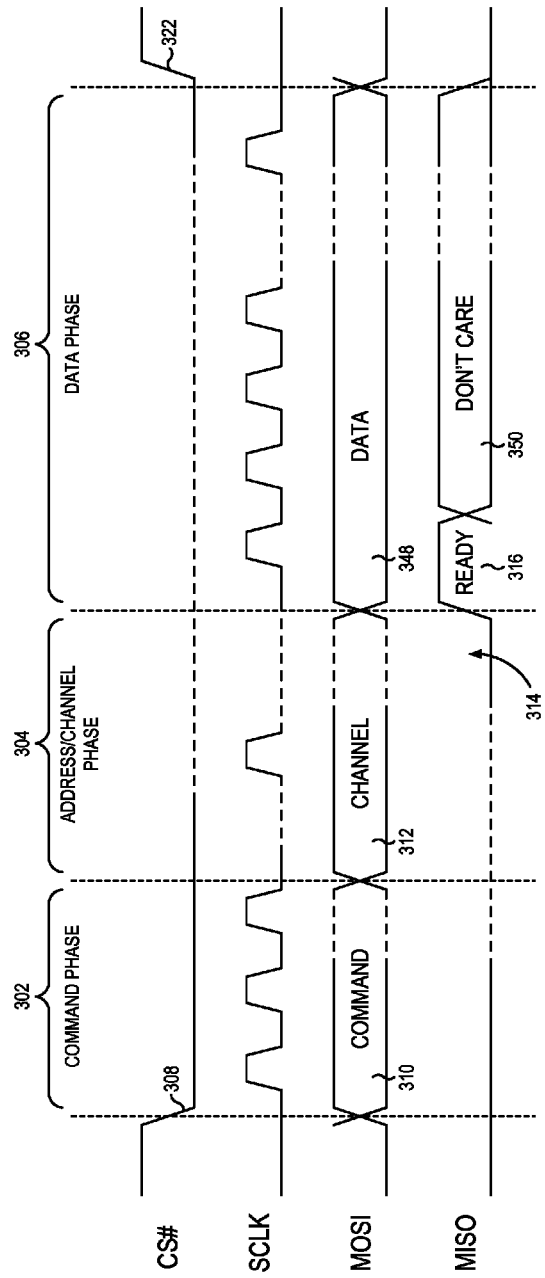
FIG. 9 depicts a timing diagram for an SPI bus transaction corresponding to a DMA READ operation according to an embodiment.

Referring now to FIG. 9, an exemplary SPI bus operation is depicted that corresponds to a DMA READ operation to transfer data from memory to the SIO device. This SIO memory READ operation is recognized and trapped by the interface controller, which maps the trapped operation into a corresponding bit-serial bus transaction, and executes this corresponding bit-serial bus transaction on the SPI bus.

For the exemplary DMA READ operation depicted here, the corresponding SPI bus transaction includes a command phase 302, an address/channel phase 304, and a data phase 306, as before. During each respective phase, a corresponding command identifier 310, channel (i.e., "address") identifier 312, and data group 348 is conveyed in a bit-serial manner on the SPI bus.

In this case, the command identifier 310 indicates to the SPI slave device that the transaction is a DMA READ operation, and the DMA channel identifier 312 corresponds to the requesting channel indicated in the DMA request received by the SPI Host, as described above. Insertion of a WAIT state may be achieved, as before, by the SPI slave device driving the MISO pin low at time 314 prior to the last bit of the channel identifier 312, and then, when ready, driving the MISO pin high for a clock cycle 316 to indicate READY and to thus start the data phase 306 of the SPI bus transaction. The SPI Host then bit serially transmits the data group 348 on each SCLK during the data phase 306.

In certain embodiments for the DMA WRITE operation (or DMA READ operation), the DMA data group 318 (or 348) may be fixed in size, or may be variable and its size indicated by a sub-field of the command identifier 310 or by the channel identifier 312. For example, a channel identifier of 0, 1, or 2 may indicate a "single-mode" DMA transfer having a corresponding 8-bit data group, so that only a single byte is transferred at a time. A channel identifier of 4, 5, 6, or 7 may indicate a "single-mode" DMA transfer having a corresponding 16-bit data group, so that two bytes are transferred at a time.

For a demand or block transfer, the SPI Host can transfer up to a maximum of 64 bytes, or stopping whenever the SPI slave controller de-asserts the DRQ#, as described above in regards to FIG. 7. Since there may be some uncertainty in the timing when such a de-assertion occurs, the SPI slave device may be able to accept one (or more) data groups (i.e., an 8-bit byte for channels 0:2, and two 8-bit bytes for channels 4:7.

BUS MASTER WRITE Operation

Figure 10:
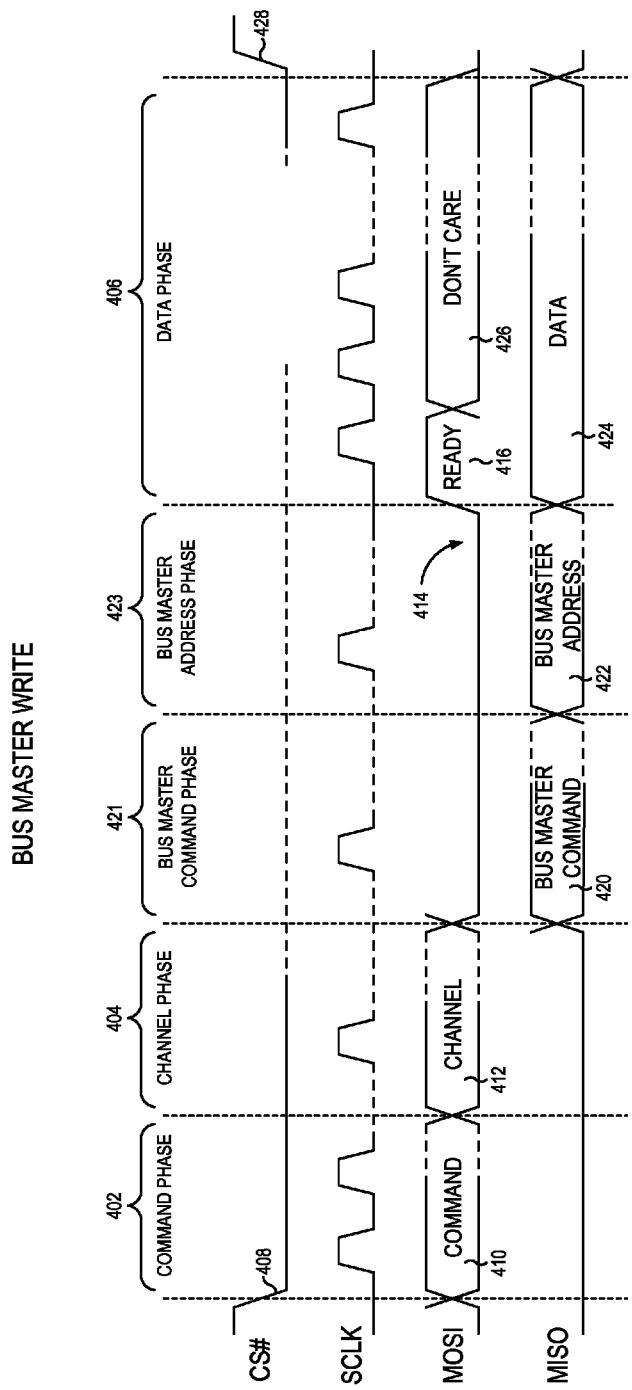
FIG. 10 depicts a timing diagram for an SPI bus transaction corresponding to a BUS MASTER WRITE operation according to an embodiment.

Referring now to FIG. 10, an exemplary SPI bus operation is depicted that corresponds to a BUS MASTER operation to grant access of the SPI bus to a slave device, to allow the SPI slave device to provide a command, an address, and a data group to the SPI Host for writing to memory. The request for this BUS MASTER operation, as described above, is recognized and "trapped" by the SPI Host controller, which maps the trapped operation into a corresponding bit-serial bus transaction, which in this case includes a bus grant component and a bus master component, and executes this corresponding bit-serial bus transaction on the SPI bus.

For the exemplary BUS MASTER operation depicted here, the corresponding SPI bus transaction includes a command phase 402, an address/channel phase 404, a bus master command phase 421, a bus master address phase 423, and a data phase 406. During each respective phase, a corresponding command identifier 410, channel identifier 412, bus master command identifier 420, bus master address identifier 422, and data group 424 are conveyed in a bit-serial manner on the SPI bus. The SPI bus transaction is initiated by the SPI Host controller by driving the CS# signal to an active state at falling edge 408, and the CS# signal is held active low for the duration of the SPI bus transaction.

The SPI Host then bit-serially drives the command identifier 410 on the MOSI pin, which command identifier 410 indicates to the SPI slave device that the transaction is a BUS MASTER operation. In certain embodiments, the size of the command identifier 410 may be a 4-bit field, although other field sizes are also easily accommodated. The channel identifier 412 identifies which bus master channel has been granted access to the SPI bus, in accordance with the request received on the DRQ# pin, as mentioned above. In certain embodiments, the size of the channel identifier 412 may also be a 4-bit field, although other channel field sizes are also easily accommodated. The channel field may be fixed in size, or may be variable and its size indicated by a sub-field (or other encoding) of the command identifier 410.

The SPI slave controller that issued the bus master request is presumed ready to immediately reply when SPI bus access is granted by the SPI Host controller. Thus, immediately after the channel phase 404 is complete, the SPI slave controller that has been granted bus access transmits a bus master command identifier 420, followed by a bus master address identifier 422. In certain embodiments, the bus master command identifier 420 provides an indication of the size of the transfer to be accomplished (i.e., the size of the data group 424), and provides an indication of whether the operation is a read or write operation. In certain embodiments, the bus master address identifier 422 may be a 32-bit address field, although other field sizes may be easily accommodated. The bus master address identifier 422 may be fixed in size, or may be variable and its size indicated by a sub-field (or other encoding) of the bus master command identifier 420.

FIG. 10 corresponds specifically to a WRITE operation, in which the data group 424 is communicated by the SPI slave device to the SPI Host. If the SPI Host device is not immediately ready to receive the data to be written, a WAIT state may be inserted by the SPI Host device driving the MOSI pin low at time 414 prior to the last bit of the bus master address phase 423, and then, when ready, driving the MOSI pin high for a clock cycle 416 to indicate READY and to thus start the data phase 406 of the SPI bus transaction. The SPI Slave device may present and hold the first bit of the data group 424 on the MISO pin during the WAIT state, and the SPI Host samples the MISO pin during the same clock cycle that it drives the READY indication on the MOSI pin, and the SPI slave can then bit-serially transmit remaining bits of the data group 424 beginning on the next clock. In some embodiments, the SPI Slave device waits until the READY indication is transmitted, then bit-serially transmits the data group 424 beginning on the next clock.

At the conclusion of the data phase 406, the bit-serial transaction is complete, and the SPI Host controller de-asserts the CS# pin at rising edge 428 to de-select the particular SPI slave device.

BUS MASTER READ Operation

Figure 11:
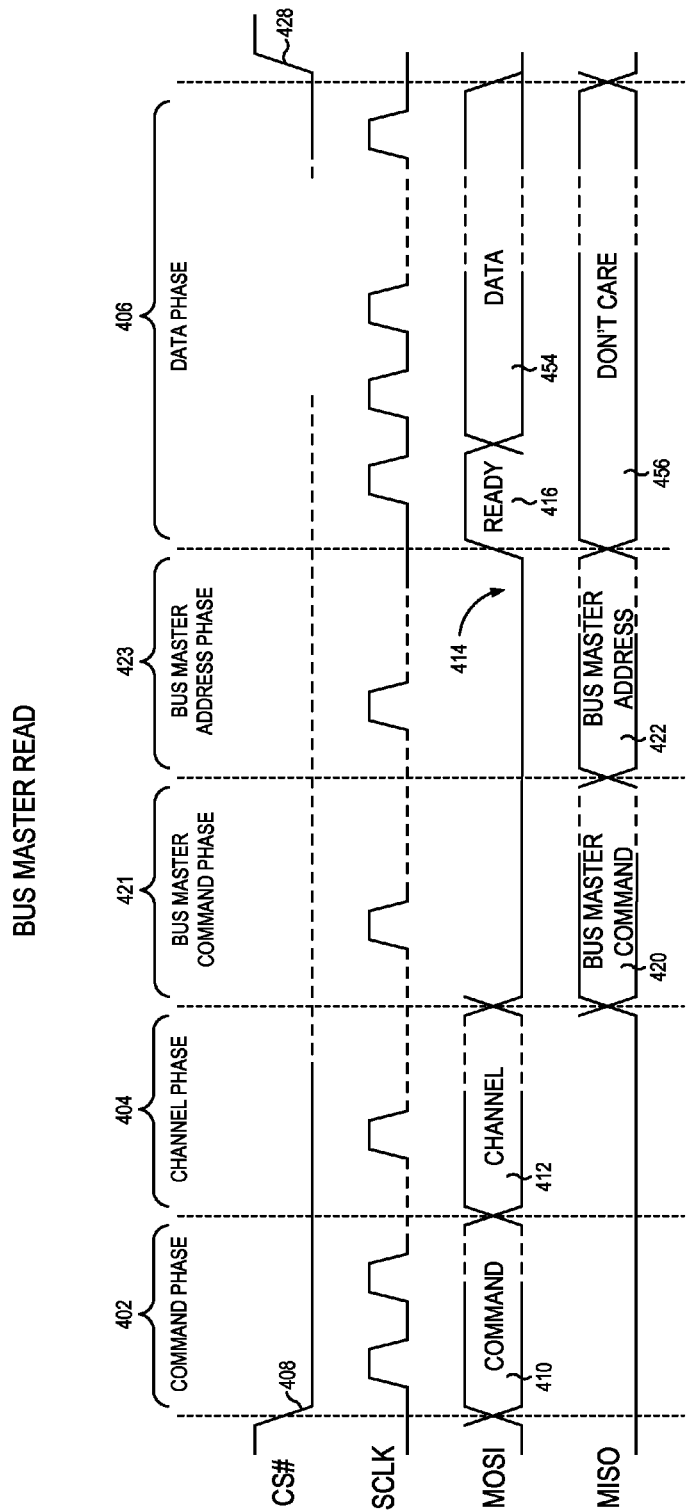
FIG. 11 depicts a timing diagram for an SPI bus transaction corresponding to a BUS MASTER READ operation according to an embodiment.

FIG. 11 corresponds to a BUS MASTER operation in which the SPI slave device requests a READ operation and provides a read address, and in response a data group 454 is communicated by the SPI Host device to the SPI Slave device. In this case, the bus master command identifier 420 indicates a read operation, as well as an indication of the size of the transfer to be accomplished, and the bus master address identifier 422 provides a read address for the transfer (i.e., a starting address of the block to be transferred).

If the SPI Host device is not immediately ready to transmit the read data, a WAIT state may be inserted by the SPI Host device driving the MOSI pin low at time 414 prior to the last bit of the bus master address identifier 422, and then, when ready, driving the MOSI pin high for a clock cycle 416 to indicate READY and to thus start the data phase 406 of the SPI bus transaction. The SPI Host then bit-serially transmits the data group 454 beginning on the next clock. During the data phase 406, the state of the MISO pin is a "don't care" since the SPI Host is transmitting data to the SPI Slave.

Other Embodiments

The techniques described above may be employed in a variety of system configurations and devices. For example, the external controller mentioned above may be incorporated within any externally-connected "Southbridge" device or Fusion Controller Hub (FCH), or within any APU with an embedded FCH. In addition, some or all of the functionality mentioned above may be incorporated into many kinds of generic 8-bit, 16-bit, or 32-bit microcontrollers.

The techniques described above may be employed in x86 systems as well as other systems having legacy bus operations no longer supported in specific hardware implementations. In the x86 market space, the techniques are applicable across the entire x86 CPU segment, such as mobile, desktop, and server segments.

The techniques described above may be employed to provide legacy bus operation support across a bit-serial bus other than an SPI bus, such as, for example, across an I2C bus (i.e., I²C bus). As used herein, a device "coupled" to another device means either a directly coupled (i.e., a single bus coupled to each of the two devices) or indirectly coupled (i.e., at least one intervening device, and at least two busses, coupling the two devices together). As used herein, an address phase and an address/channel phase are used interchangeably, without any intended distinction other the context of the particular illustration. As used herein, an SPI slave device may refer to an SPI slave controller, a microcontroller within which a SPI slave controller may be implemented, or another device coupled to such microcontroller, as the context should make clear.

The use herein of the word "exemplary" is intended to serve as one example embodiment and not to limit the application by construing the embodiment as preferred or advantageous over other embodiments. The inventive aspects described herein are specifically contemplated to be used alone as well as in various combinations. The invention in several aspects is contemplated to include circuits (including integrated circuits), related methods of operation, methods for making such circuits, systems incorporating same, and computer-readable storage media encodings of such circuits and methods and systems, all as described herein in greater detail and as set forth in the appended claims.

While circuits and physical structures have been generally presumed in describing embodiments of the invention, it is well recognized that in modern semiconductor design and fabrication, physical structures and circuits may be embodied in a computer readable medium as data structures for use in subsequent design, simulation, test, or fabrication stages. For example, such data structures may encode a functional description of circuits or systems of circuits. The functionally descriptive data structures may be, e.g., encoded in a register transfer language (RTL), a hardware description language (HDL), in Verilog, or some other language used for design, simulation, and/or test. Data structures corresponding to embodiments described herein may also be encoded in, e.g., Graphic Database System II (GDSII) data, and functionally describe integrated circuit layout and/or information for photomask generation used to manufacture the integrated circuits. Other data structures, containing functionally descriptive aspects of embodiments described herein, may be used for one or more steps of the manufacturing process.

Computer-readable storage media include non-transitory, tangible computer readable media, e.g., a disk, tape, or other magnetic, optical, semiconductor, or electronic storage medium. In addition to computer-readable storage medium having encodings thereon of circuits, systems, and methods, the computer readable storage media may store instructions as well as data that can be used to implement embodiments described herein or portions thereof. The data structures may be utilized by software executing on one or more processors, firmware executing on hardware, or by a combination of software, firmware, and hardware, as part of the design, simulation, test, or fabrication stages.

References in the claims to a numbered item, such as a "third" sub-field, are for clarity, and do not necessarily imply that lower-numbered items of the same type are also included in the recited claim.

The foregoing detailed description has described only a few of the many possible implementations. For this reason, this detailed description is intended by way of illustration, and not by way of limitations. Variations and modifications of the embodiments disclosed herein may be made based on the description set forth herein. It is only the following claims, including all equivalents, that are intended to define the invention.

What is claimed is:

1. A method for use in emulating host processor legacy bus operation over a bit-serial bus, said method comprising:
    recognizing, by an interface controller, a legacy bus operation on a first bus coupled between the interface controller and a host processor executing host software issuing the legacy bus operation to the first bus;
    trapping, in the interface controller, the legacy bus operation for the host processor;
    mapping, by the interface controller, the trapped legacy bus operation into a bit-serial bus transaction having at least a command phase, an address phase, and a data phase;
    transacting the command phase and address phase of the bit-serial bus transaction with an external controller on a bit-serial bus; and then
    after receiving or transmitting a ready indication, transacting the data phase of the bit-serial bus transaction with the external controller.

2. The method as recited in claim 1 wherein:
    the command phase conveys a command identifier for the bit-serial bus transaction; and
    the command identifier encodes a size for at least one of the address phase and the data phase of the bit-serial bus transaction.

3. The method as recited in claim 1 wherein:
    the ready indication comprises a first data state presented on a first data line of the bit-serial bus before completion of the address phase if not yet ready to transact the data phase of the bit-serial bus transaction, and a second data state presented on the first data line of the bit-serial bus to indicate readiness to transact the data phase of the bit-serial bus transaction during subsequent clock cycles of the bit-serial bus.

4. The method as recited in claim 1 wherein:
    the trapped legacy bus operation comprises a host processor legacy I/O operation having a separate I/O address space different than memory address space;
    the command phase conveys a command identifier which specifies the host processor legacy I/O operation as an I/O read operation or an I/O write operation;
    the address phase conveys an I/O port number associated with the host processor legacy I/O operation;
    the data phase conveys a data group associated with the host processor legacy I/O operation; and
    the ready indication is received by the interface controller to indicate the external controller on the bit-serial bus is ready to transact the data phase of the bit-serial bus transaction.

5. The method as recited in claim 4 wherein:
    the ready indication comprises a first data state presented on a first data line of the bit-serial bus before completion of the address phase if the external controller is not yet ready to transact the data phase of the bit-serial bus transaction, and a second data state presented on the first data line of the bit-serial bus to indicate the external controller is ready to transact the data phase of the bit-serial bus transaction during subsequent clock cycles of the bit-serial bus.

6. The method as recited in claim 4 wherein:
    the command identifier encodes a size for the data group associated with the host processor legacy I/O operation.

7. The method as recited in claim 6:
    wherein a first sub-field of the command identifier encodes the host processor legacy I/O operation as a read I/O operation or a write I/O operation;
    wherein a second sub-field of the command identifier encodes a number which indicates the size for the address phase which conveys the I/O port number for the host processor legacy I/O operation; and
    wherein a third sub-field of the command identifier encodes a number which indicates the size for the data group associated with the host processor legacy I/O operation.

8. The method as recited in claim 6 wherein:
    the bit-serial bus comprises an SPI bus;
    the command identifier comprises an 8-bit entity;
    the I/O port number comprises a 16-bit entity; and
    the data group for a given operation comprises an 8-bit, 16-bit, or 32-bit entity.

9. The method as recited in claim 1 wherein:
    the trapped legacy bus operation comprises a bus operation requested by the external controller on the bit-serial bus; and the command phase and the address phase together communicate the requested bus operation and a channel number associated with the requested bus operation.

10. The method as recited in claim 9 wherein the host processor legacy bus operation comprises a legacy direct memory access (DMA) operation having a separate channel address space different than memory address space.

11. The method as recited in claim 9 wherein the host processor legacy bus operation comprises a legacy bus master (BM) operation, and wherein the method further comprises:
after said transacting the address phase, receiving a bus master command phase and bus master address phase from the external controller; and then
asserting the ready indication to the external controller when ready to transact the data phase of the bit-serial transaction.

12. The method as recited in claim 9 further comprising:
conveying a bus operation request to the interface controller by way of a bit-serial command to indicate a type of bus operation, whether read or write, and a channel number associated with the requested bus operation.

13. The method as recited in claim 1 wherein the interface controller is a south-bridge and the external controller is a super I/O controller coupled to the south-bridge using a serial peripheral interface bus.

14. An apparatus comprising:
an interface controller operable to:
recognize a legacy bus operation on a first bus coupled between the interface controller and a host processor, the legacy bus operation being issued to the first bus by the host processor executing host software issuing the legacy bus operation to the first bus;
trap the legacy bus operation;
map the trapped legacy bus operation into a bit-serial bus transaction having at least a command phase, an address phase, and a data phase;
transact the command phase and address phase of the bit-serial bus transaction with an external controller on the bit-serial bus; and then
after receiving or transmitting a ready indication, transact the data phase of the bit-serial bus transaction with the external controller.

15. The apparatus as recited in claim 14 further comprising:
said external controller on the bit-serial bus, wherein said external controller is operable to provide the ready indication to indicate the external controller is ready to transact the data phase of the bit-serial bus transaction; and wherein said external controller comprises a second interface coupled to a target device for the legacy bus operation.

16. The apparatus as recited in claim 14 wherein the bit-serial bus comprises an SPI bus.

17. The apparatus as recited in claim 14 wherein:
the trapped legacy bus operation comprises a host processor legacy I/O operation having a separate I/O address space different than memory address space;
the command phase conveys a command identifier which specifies the host processor legacy I/O operation as an I/O read operation or an I/O write operation;
the address phase conveys an I/O port number associated with the host processor legacy I/O operation;
the data phase conveys a data group associated with the host processor legacy I/O operation; and
the ready indication is received by the interface controller to indicate the external controller is ready to transact the data phase of the bit-serial bus transaction.

18. The apparatus as recited in claim 14 further comprising:
said host processor, wherein said host processor is coupled to the interface controller by way of at least the first bus.

19. The apparatus as recited in claim 14 wherein the interface controller is a south-bridge and the external controller is a super I/O controller coupled to the south-bridge using a serial peripheral interface bus.

20. A computer readable storage medium comprising data structures encoding an aspect of an interface controller, said interface controller being operable to:
trap a legacy bus operation for a host processor, the legacy bus operation being recognized by the interface controller on a first bus coupled between the interface controller and the host processor executing host software issuing the legacy bus operation;
map the trapped legacy bus operation into a bit-serial bus transaction having at least a command phase, an address phase, and a data phase;
transact the command phase and address phase of the bit-serial bus transaction with an external controller on the bit-serial bus; and then
after receiving or transmitting a ready indication, transact the data phase of the bit-serial bus transaction with the external controller.

21. The computer readable storage medium as recited in claim 20 wherein the interface controller is a south-bridge and the external controller is a super I/O controller coupled to the south-bridge using a serial peripheral interface bus.

* * * * *